Feb. 20, 1934.    J. J. SMITH    1,948,318
GREASE GUN ATTACHMENT
Filed Aug. 18, 1931
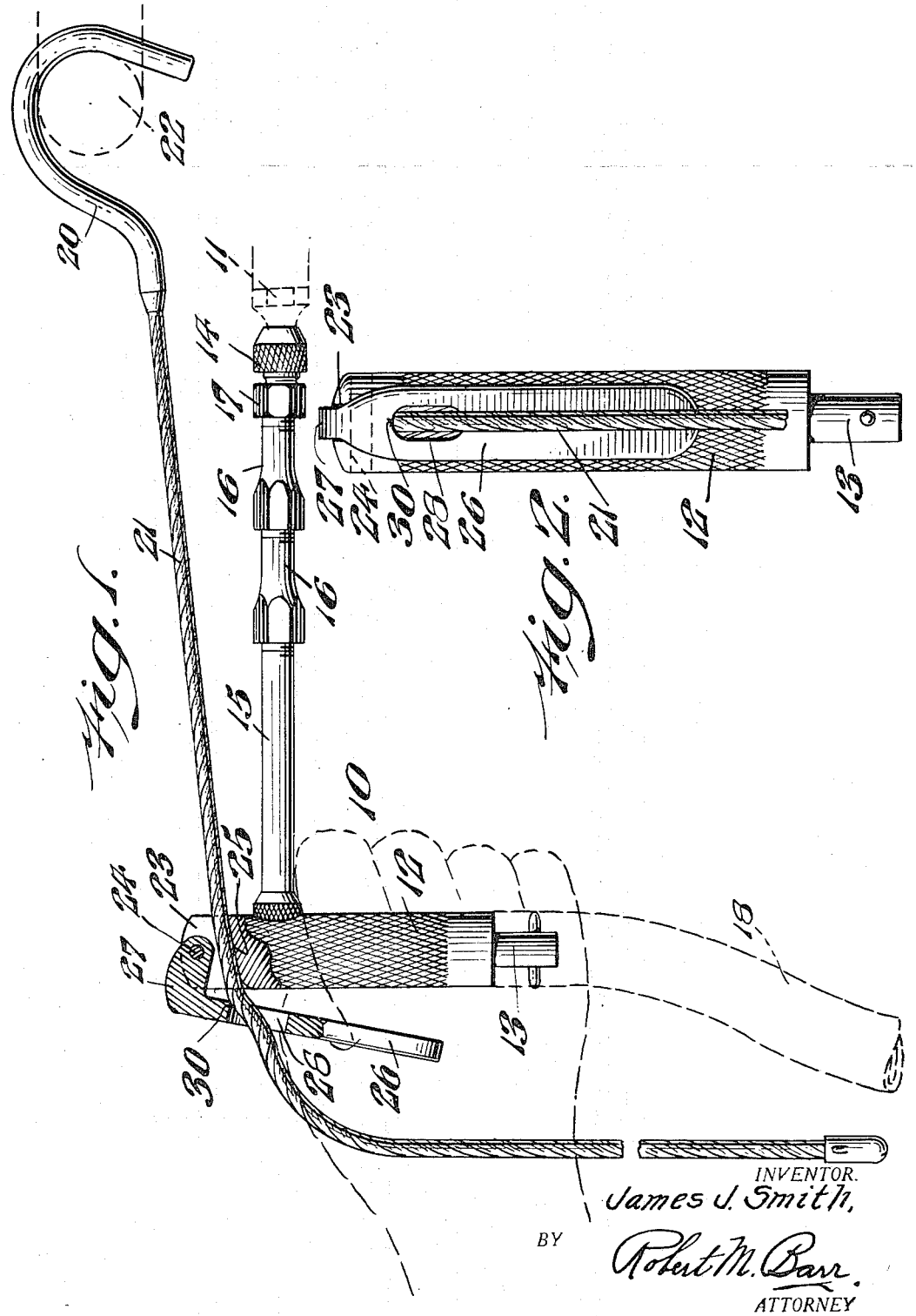
INVENTOR.
James J. Smith,
BY Robert M. Barr.
ATTORNEY Patented Feb. 20, 1934

1,948,318

UNITED STATES PATENT OFFICE 1,948,318

GREASE GUN ATTACHMENT

James J. Smith, Philadelphia, Pa.

Application August 18, 1931. Serial No. 557,827

2 Claims. (Cl. 184—105)

The present invention relates to pressure lubricating systems and more particularly to a device for holding a grease gun or grease fitting in operating position.

In the operation of grease guns as heretofore constructed it has been customary and is the usual practice to place the end of the grease gun in face to face relation with the inlet fitting to the part to be lubricated and then admit grease or other lubricant under pressure and supply it to the bearings. During this delivery of the grease through the gun to the bearings the former is held by manual pressure against the fitting and considerable strength has to be exerted to maintain the parts properly engaged in leakproof relation, but in spite of the exerted physical effort the heavy back pressure from the grease always causes a breaking of the joint at some time during the operation so that grease exudes from between the parts and is wasted, especially where the bearing is caked with dry grease.

Some of the objects of the present invention are to provide a novel means for holding a grease gun in operative position so that no leakage takes place during the ejection of the lubricating material under the ordinary heavy pressure; to provide a device which is so simple in construction that it can be used with the ordinary grease gun with practically no additional trouble in attaching the grease gun in operative position and which functions effectively and efficiently for the purpose intended; to provide means whereby a grease gun after being pressed to operative position against a fitting with a leakproof joint can be anchored in this position and resist any tendency of the joint to open under the applied pressure; to provide an attachment for grease guns which can be simultaneously brought into use during positioning of the gun for its discharge function; and to provide other improvements as will hereinafter appear.

In the accompanying drawing Fig. 1 represents a side elevation in part section of a grease gun attachment embodying one form of the present invention; and Fig. 2 represents a rear elevation of the same.

Referring to the drawing one form of the present invention is shown consisting of an attachment 10 which is adapted to be placed and held against a grease receiving fitting 11 in order to conduct the grease to the part or parts to be lubricated. As shown the attachment 10 consists of tubular handle 12 provided with an inlet fitting 13, which is preferably axially disposed of the handle 12, and a discharge nozzle 14, which is preferably at the end of an elongated laterally disposed pipe 15. The length of the pipe 15 may be variable to suit different conditions and to that end may be made up of a succession of interconnected nipples 16, the number of which to be used depends upon the length desired. The nozzle 14 can be attached to the end of any one of the nipples 16 by a nut or bushing member 17. The fitting 13 serves to connect the handle 12 to the grease supplying hose 18 and can be of any suitable type, though in some instances the gun may be directly mounted as a permanent part of the hose 18. The nozzle 14 is of the type which is shaped and arranged to seat flush against the associated fitting 11 where in operation the manual pressure against the handle 12 is depended upon to seal the joint between the parts to prevent leakage of grease during the grease transferring operation.

In order to supplement the manual holding of the gun attachment against the fitting 11 so that, regardless of the reaction pressure of the grease, there can be no breaking of the joint between the nozzle 14 and the fitting 11, a hook 20 or other suitable attaching means is provided as the terminal of a cable 21. This hook 20 serves to engage some fixed part 22 conveniently located with respect to the fitting 11 which is to receive the nozzle 14 while the cable 21 is to be stretched taut and anchored in such a way as to maintain the distance of the handle 12 from the fitting 11 constant after the gun is positioned for operation and release of the grease.

For anchoring the cable 21 the upper end of the handle 12 is provided with a slot 23 of a depth sufficient to receive the cable 21 and allow the transverse insertion of a pin 24 above the cable 21. Preferably the floor 25 of the slot 23 is rearwardly inclined to more effectively guide the cable 21 to its anchoring position angular with respect to the axis of the stretched part of the cable. This anchoring action is carried out through the medium of a gripper plate 26 having an offset head 27 pivotally mounted upon the pin 24. The arrangement is such that in assembled condition the plate 26 lies in the plane of the back of the handle 12 so that when the handle is grasped in the hand the plate 26 will rest easily in the palm of the hand. An opening 28 extends through the plate 26 adjacent the head portion for the passage of the cable 21 and the upper end of this opening is so located with respect to the handle 12 that its lateral swing about the pivot 24 will cause it to bite against and press the cable 21 against the opposed edge of the bottom of the slot 23. Thus when the gripper plate 26 is swung clockwise as shown in Fig. 1 it will bring the opening 28 into substantial register with the passage 23 and thus allow the cable 21 to be freely movable through the slot 23 and opening 28 and in this way it may be pulled taut when the hook 20 is attached to a fixed part. When the handle is gripped tightly the gripper plate 26 is swung counterclockwise and causes the opening 28 to swing in a downward arc which brings the gripping edge 30 against the cable 21 to clamp it against the handle 12.

In the operation of the device the gun with its attachment 10 is brought manually in the customary manner to its delivery position with the nozzle 14 receiving and abutting the fitting 11 and when it is so held the hook 20 is placed over a convenient fixed part in relatively close proximity to the fitting 11. With this accomplished the cable 21 is pulled taut by hand and then the gripper plate 26 is gripped and pressed toward the handle 12 to maintain the taut relation and insure the gun being held rigidly against the fitting 11. It has been found in practice that the stretching of the cable 21 to its taut position can be very advantageously done by slightly raising the handle 12 so that the pipe 15 is slightly inclined and then after the cable has been drawn taut and locked by the gripping of the plate 26 the pressure of the end upon the handle 12 will bring the pipe 15 back to its horizontal position and thus increase the tension on the cable. It will readily be seen that this is a simple way of tensioning the cable in that the leverage of the attachment is very effective for the purpose.

It will now be apparent that a complete unitary combination of grease gun and anchoring device has been devised wherein it is possible to manually position a grease gun for discharge of grease and of pressure without subjecting the operator to the added strain of pressing the attachment against the associated fitting. It is, of course, necessary to manually hold the gun in position and firmly clamp the gripping plate 26 so that the cable 21 can not slip during the holding operation, but this is a relatively easy manual exertion as compared to that as has been heretofore necessary to overcome the back-pressure of the discharged grease.

In the foregoing the attachment of the present invention is described as being for use with a grease gun but this is not to be taken as a limitation in that the the term gun is used in a generic sense and is to be considered as including any kind of a fitting which is connected to a source of grease under pressure.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. The combination of a grease gun discharge nozzle part arranged to be manually held against a fitting, a handle for said part, a cable, fastening means on said cable for engaging a fixed part with which said fitting is associated, and a gripper plate on said handle for clamping said cable in stretched condition to anchor said nozzle part in its held position.

2. The combination of a grease gun discharge nozzle part, a handle for manually holding said part against a fitting, a cable, fastening means on said cable for engaging a fixed part with which said fitting is associated, and a gripper plate pivoted to said handle to be grasped simultaneously with said handle, said plate having an opening for said cable so located as to clamp said cable against said handle to maintain said cable taut and with said nozzle part anchored against said fitting.

JAMES J. SMITH.